United States Patent [19]
Malone

[11] Patent Number: 5,755,839
[45] Date of Patent: May 26, 1998

[54] MOLTEN METAL REACTOR SWING SYSTEM AND PROCESS

[75] Inventor: Donald P. Malone, Grayson, Ky.

[73] Assignee: Ashland, Inc., Ashland, Ky.

[21] Appl. No.: 425,938

[22] Filed: Apr. 19, 1995

[51] Int. Cl.[6] .................................................. C10J 3/48
[52] U.S. Cl. ........................... 48/92; 48/61; 48/116
[58] Field of Search ............................ 48/61, 92, 116, 48/77, 206, 210; 202/219; 422/184

[56] References Cited

U.S. PATENT DOCUMENTS

| | | | |
|---|---|---|---|
| 1,803,221 | 4/1931 | Tyrer . | |
| 2,647,045 | 7/1953 | Rummel | 48/206 |
| 4,187,672 | 2/1980 | Rasor | 60/39 |
| 4,338,096 | 7/1982 | Mayes | 23/230 |
| 4,345,990 | 8/1982 | Fahlström et al. | 48/92 |
| 4,406,666 | 9/1983 | Paschen et al. | 48/92 |
| 4,574,714 | 3/1986 | Bach et al. | 110/346 |
| 4,597,771 | 7/1986 | Cheng | 48/92 |
| 4,602,574 | 7/1986 | Bach et al. | 110/346 |
| 5,435,814 | 7/1995 | Miller et al. | 48/92 |

*Primary Examiner*—Timothy McMahon
*Attorney, Agent, or Firm*—Richard C. Willson, Jr.; Donald E. Zinn

[57] ABSTRACT

Two or more (preferably three) simple single-chamber crucibles contain molten metal and are successively fed hydrocarbon feed to produce hydrogen, then fed oxygen-containing gas to produce CO, then fed hydrocarbon again, etc. Their operation is controlled by a swing valving sequence which connects the crucibles to a hydrogen header when they are producing hydrogen and to a CO header when they are producing CO, and possibly to a vent (or to the CO header) during the transition between $H_2$ production and CO production (see FIG. 2). Each crucible (FIGS. 3, 4) preferably is in a pressure-tight steel housing, uses segmented refractories for simplicity in construction and reduction of thermal expansion effects and has an inlet lance (sparging tube) for feeding hydrocarbon and an outlet which emits product gases. Both inlet and outlet are preferably located in the head of each crucible. Swing valves are preferably located downstream of product heat-exchangers for lower temperature operation. Minimum dissolved carbon level during occasional cycles can be reduced to oxidize any sulfur in the melt and purge sulfur from the melt. Then vanadium can be periodically purged from the melt by still further oxidation.

17 Claims, 4 Drawing Sheets

5,755,839

MOLTEN METAL REACTOR SWING SYSTEM AND PROCESS

CROSS REFERENCE TO RELATED APPLICATIONS

Copending U.S. patent applications Ser. No. 763,097, filed Sep. 20, 1991, (docket 6391AUS); Ser. No. 08/051, 753, filed Apr. 22, 1993, (docket 6391MUS); Ser. No. 08/165,068, filed Dec. 10, 1993, (docket 6431BUS); Ser. No. 08/303,806, filed Sep. 9, 1994, (docket 6464AUS), respectively.

BACKGROUND OF THE INVENTION

I. Field of the Invention

This invention relates to the direct gasification of a hydrocarbon into two streams; a relatively pure hydrogen gas-containing stream and a carbon oxide-containing stream, and more particularly to the employment of a plurality of single chamber molten metal reactors and a swing valve system for selectively and sequentially connecting the single chamber reactors to a common hydrogen header and a CO header while supplying a hydrocarbon feed to the single chamber reactors or an oxidant thereto.

II. Description of the Prior Art

Typically, molten iron gasifiers disclose either a single reaction zone without circulation between plural zones, or two-zone molten iron gasifiers with circulation therebetween and with a hydrocarbon feed introduced into a first zone and an oxidant into a second zone for the production of a carbon oxide in the second zone by oxidation of a carbon dissolved in the molten iron.

U.S. Pat. Nos. 4,574,714 and 4,602,574 to Bach exemplify the single reaction zone molten iron gasifier, while U.S. Pat. No. 1,803,221 to Tyrer, U.S. Pat. No. 4,187,672 to Razor, U.S. Pat. No. 4,338,096 to Mayes and U.S. Pat. No. 2,647,045 to Rummel exemplify the two-zone molten iron gasifier concept. While such systems provide reasonable results, none of the systems effect the high purity production of both hydrogen and carbon oxide gases via controlled collection of respective gases at different times from a plurality of single-chamber molten iron reactors or crucibles keyed to the introduction of a hydrocarbon feed and an oxidant to the respective crucibles.

Feed Materials

Natural Gas ($CH_4$), liquified petroleum gas (LPG), propane, petroleum naphtha, light or heavy distillate, vacuum and other resids, solvent deasphalted pitch (SDA), aromatic extracts, FCC, slurry oil, trash, garbage, tires, coal and virtually any other hydrocarbon-containing material.

Products

Products are CO, $CO_2$, $H_2$, plus sulfur and other contaminants in feed which may be outputted in slag which can be periodically drained of the molten metal. In refineries, sulfur is preferably outputted as gas in the hydrogen stream and then treated conventionally by the Claus process and the SCOT (Shell Claus Off Gas Treatment) with SCOT (unit).

Controls

Conventional analog or digital controls may be used, measuring temperature, preferably with optical or infrared pyrometer or protected thermocouple; carbon by spectrometers; level by nuclear radiation and admitting feed, $CH_3$, $CO_2$, $H_2O$ to maintain temperature, which must be high enough (e.g., at least 150° C. to maintain the particular metal carbon composition liquid and dissolved carbon level and $H_2$ production within preset limits. Temperature of the molten metal is preferably 1150° C. to 1600° C., more preferably 1250° to 1500° C. during feed to the reactor or crucible and usually preferably 50° C. to 150° C. higher during the oxidation cycle within the single-chamber reactors or crucibles.

The swing can be controlled on the basis of elapsed time, mass fed, percent carbon in molten metal, product purity, or other variables.

SUMMARY OF THE INVENTION

I. General Statement of the Invention

The present invention is exemplified by the utilization of two or more and preferably three simple, single chamber reactors or crucibles containing molten metal which are sequentially fed hydrocarbon feed to produce hydrogen and then an oxygen-containing gas to produce carbon monoxide. The invention utilizes a swing valving sequence which connects the multiple single chamber crucibles to a hydrogen header for collecting hydrogen when the crucibles are in a hydrogen-producing mode, responsive to the delivery of hydrocarbon feed to such reactor. The invention is further directed to the incorporation of a vent or means for connecting a reactor to the carbon monoxide header during the transition between hydrogen production and carbon monoxide production. Each reactor or crucible preferably consists of a pressure-tight steel housing supporting internally segmented refractories for simplicity in construction and the reduction of thermal expansion effects during reactor operation. Preferably, an inlet lance or sparging tube feeds hydrocarbon material downwardly through a vapor space above the molten metal for discharge at a distal end submerged within the molten metal while the head of the reactor or crucible is provided with a product gas outlet which emits product gases during reactor operation. Preferably, swing valves are located downstream of gas product heat exchangers within such product outlet for lower temperature operation and longer life of the swing valve. The system may be timer operated with switching from hydrogen production to carbon monoxide production every several minutes.

Minimum dissolved carbon level during occasional carbon oxidation cycles may be further reduced to also oxidize any sulfur in the melt and to purge sulfur from the melt. Thereafter, vanadium may be periodically purged from the melt by further oxidation. These higher oxidation cycles may be initiated and terminated in response to measurement of sulfur (and/or vanadium) content in the melt or products.

The invention is further characterized by the incorporation of a mixing tank for mixing diluent and pitch equipped with a motor driven mechanical stirrer with a bottom outlet leading to a high pressure pump for varying the viscosity of the pitch fed to the single chamber reactors. Preferably, a source of natural gas connects via a second molten iron bath penetrating lance, providing temperature control and heat balance to each reactor and compensating for fluctuations in carbon:hydrogen ratio of the pitch feed.

The invention is further directed to causing the product gases, i.e., hydrogen and carbon monoxide, flowing outward through the product gas outlet lines to pass through a quench and successively through downstream coolers prior to entry into a knock-out drum having a bottom outlet and a recycle system for the return of condensed water back to the quench. The hydrogen product gas from the knock-out drum may be further fed to a scrubber which removes hydrogen sulfide ($H_2S$) and emits a substantially sulfur-free hydrogen stream to a downstream compressor system. The sulfur-free hydrogen stream flows to a recycle compressor which increases the pressure approximately one atmosphere and combines new hydrogen with recycle hydrogen and carbon monoxide emanating from a methanol knock-out drum. The combined $H_2/CO$ stream may be directed to a further heat exchanger and through a pair of conversion reactors connected in parallel with the outlet stream from that heat exchanger directed through a further cooler and back to the methanol knock-out drum, from the bottom of which condensed methanol and water are removed as a crude methanol stream. Such stream may then be subsequently subjected to drying and purification. Simultaneously, a reactor or reactors receiving an oxidant and producing a carbon monoxide product gas which is then subjected to a water quench and a water cooling process, with the gas being sent to a water removing drum from which recovered water is recycled through a pump back to the water quench. The discharging carbon monoxide stream from the water removing drum is then sent to a scrubber where the carbon monoxide gas is mixed with hydrogen in a ratio of approximately 2.01:1, which is near stoichiometric.

The present invention is thus directed both to the apparatus for direct gasification of a hydrocarbon material to hydrogen and carbon monoxide gas products using a plurality of single chamber reactors or crucibles and common periodic alternate connections of the multiple reactors to the headers dependent upon whether the hydrocarbon feed is entering the reactor or an oxidant, and the process of producing high purity product gases via such swing system.

II. Utility of the Invention

The direct gasification hydrogen and carbon monoxide plant of this invention is especially well suited to use a refinery process stream often identified as a solvent deasphalted pitch (SDA bottoms), which is a refinery byproduct stream produced when petroleum residuum is contacted with a light hydrocarbon solvent. The solvent removes the distillate oil from the residuum, leaving a pitch which is high in carbon, low in hydrogen, high in sulfur and high in metals. This stream and other streams having similar properties are present in most refineries, and all these streams can be readily used as hydrocarbon feed in this invention. Still another advantage to the hydrogen plant of this invention is the possibility of adding ethane or methane to produce substantially pure hydrogen. Examples of low hydrogen content carbon are the solvent, the asphalt, the SDA bottoms described above and residuum from the vacuum distillation tower and coal. Hydrocarbons for the purposes of obtaining substantially pure hydrogen are materials consisting of substantially only carbon and hydrogen and an H:C mole ratio of at least 1:1, preferably at least one 1.5:1 and broadly in the range of 1:1 to 4:1. Note that methane H:C is 4:1; ethane is 3:1, and octane is 2.25:1. Petroleum coke, a suitable feed, is about 0.1:1.

Tables A, B and C show preferred, more preferred, and most preferred levels of process parameters, feed and product compositions, and reactor configuration.

DESCRIPTION OF THE PREFERRED EMBODIMENTS

Figure 3:
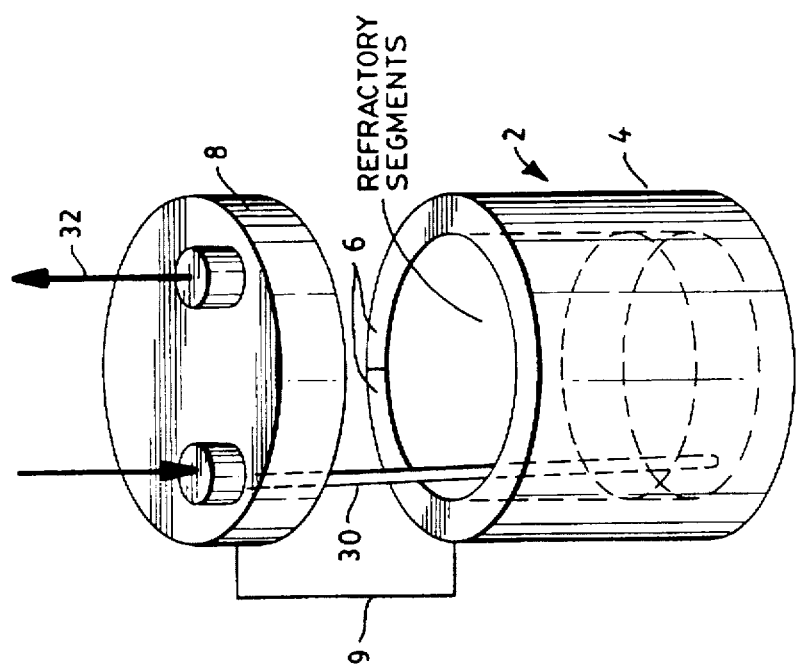
FIG. 3 is an exploded, perspective view of one of the individual reactors of FIG. 1 showing only the segmented refractories, the molten metal and the refractory bottom and top with inlet and outlet in the lid.
Figure 2:
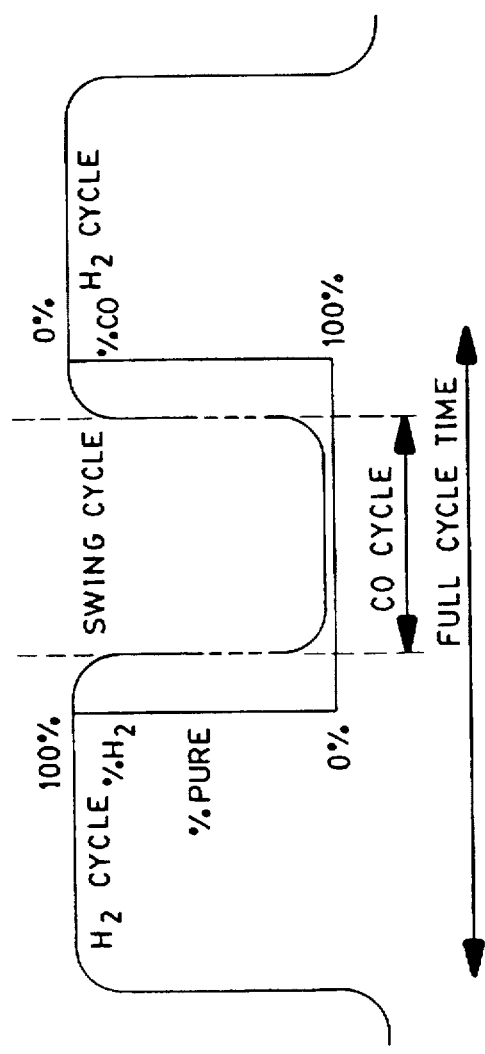
FIG. 2 is a plot of the percent purity of hydrogen product gas versus time for the swing system of FIG. 1, wherein cyclically, when hydrogen is nearly zero percent, then a CO (of CO and possibly $CO_2$) is near 100%, and vice versa.
Figure 4:
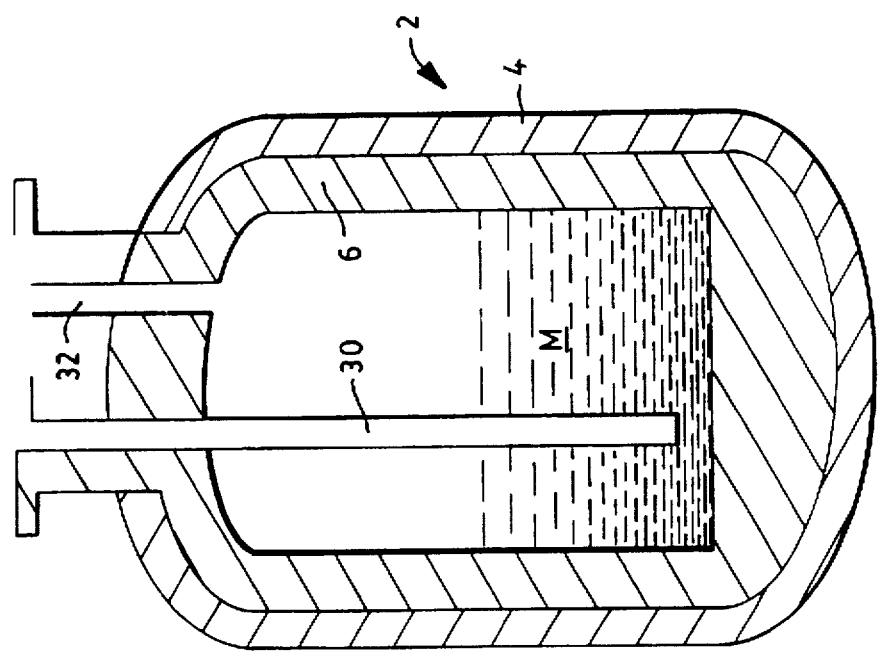
FIG. 4 is a more detailed sectional view of a molten metal reactor similar to that of FIG. 3 encased in an alloy pressure vessel with rammed thermal insulation filling the annulus between the refractory segments of the reactor and the pressure vessel. A flanged top supports nozzles for the feed inlet and product gas outlet. A packing gland surrounds the inlet lance to provide a pressure-tight fit.

According to the invention, two or more (preferably three) simple single-chamber crucibles contain molten metal and are successively fed hydrocarbon feed to produce hydrogen, then fed oxygen-containing gas to produce CO, then fed hydrocarbon again, etc. Their operation is controlled by a swing valving sequence which connects them to a hydrogen header when they are producing hydrogen and to a CO header when they are producing CO, and possibly to a vent (or to the CO header) during the transition between $H_2$ production and CO production (see FIG. 2). Each crucible 2 (FIG. 3) preferably is in a pressure-tight steel housing 4, uses segmented refractories 6 for simplicity in construction and reduction of thermal expansion effects and has an inlet lance 30 (sparging tube) for feeding hydrocarbon and an outlet 32 which emits product gases. Both an inlet for feeding hydrocarbons and an outlet which emits product gases are preferably located in the head 8 of each crucible 2, coupled to the body of the crucible by tie rods 9, FIG. 4. Swing valves are preferably located downstream of product heat-exchangers for lower temperature operation. Extra oxidation to reduce further dissolved carbon level during occasional cycles can be provided to oxidize any sulfur in the melt and purge sulfur from the melt. Then vanadium can be periodically purged from the melt by still further oxidation to oxidize the vanadium. Inorganic materials contaminating the hydrocarbon feed will usually form a slag layer floating on top of the molten metal.

The following table gives some of the reactions occurring in the various molten metal layers:

Possible Reactions Occurring in Any Slag Layer
During the Carbon Cycle and Possibly During the
Oxidation Cycle

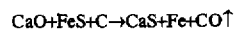

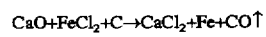

Reactions Occurring in the Molten Metal During
the Carbon Cycle

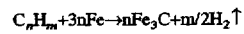

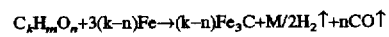

Reactions Occurring in the Molten Metal During
the Oxidation Cycle

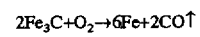

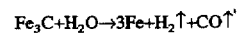

EXAMPLE 1

(Production of $H_2$ and CO according to the invention)

Figure 1:
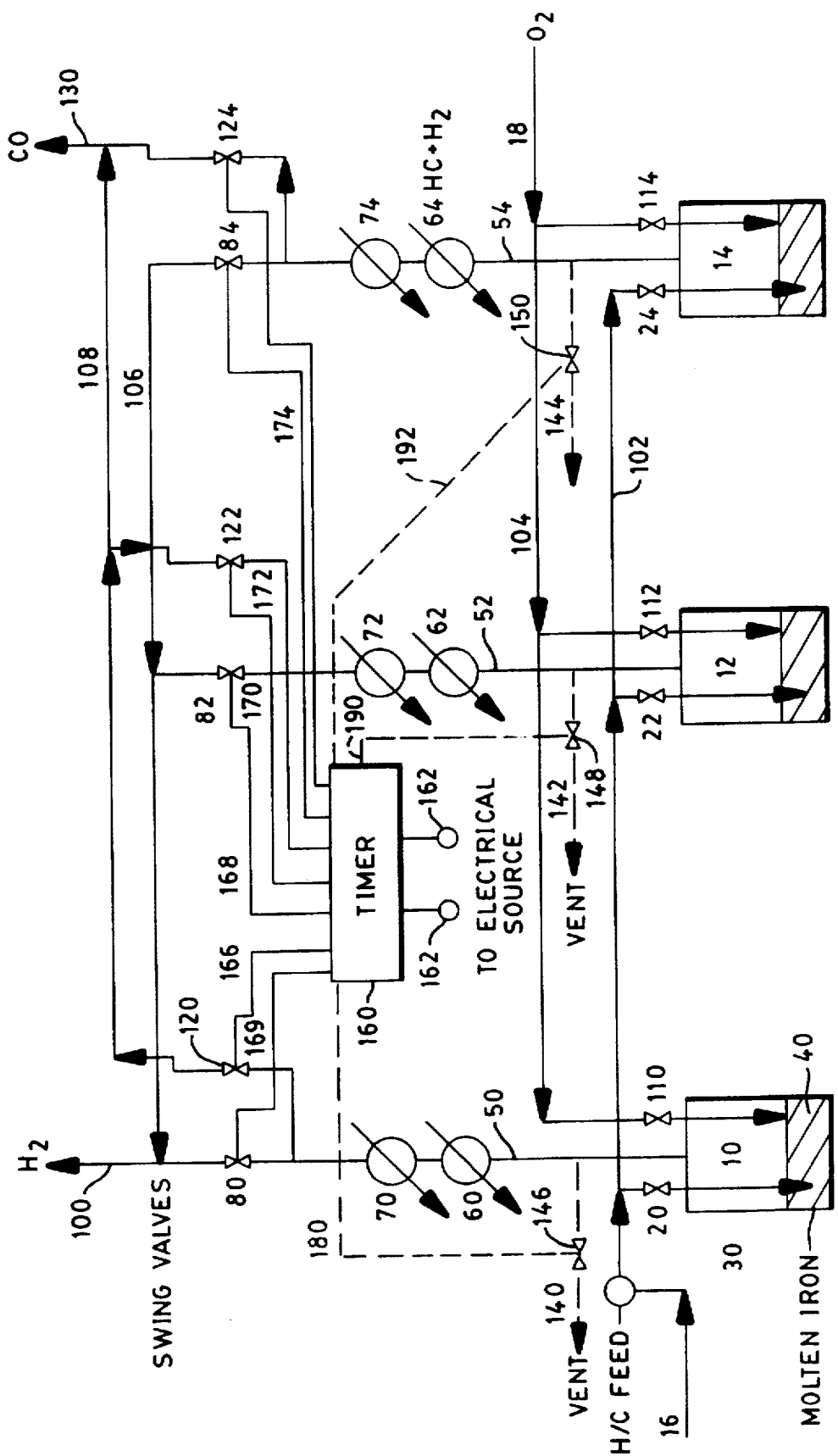
FIG. 1 is a schematic view of a swing valve system for three single chamber molten metal reactors having common headers for hydrocarbon feed and gas product removal with the swing valves downstream of the gas product coolers, allowing the swing valves to operate in a lower temperature environment from that of that of the reactors and forming a preferred embodiment of the invention.

FIG. 1 shows schematically a swing valve system indicated generally at 1 for three molten metal reactors 10, 12 and 14, respectively, which are successively connected to a hydrocarbon feed source 16, in this case feeding solvent deasphalted pitch (SDA) of the analysis shown in Table D, first four columns. Various process parameters, feed and product compositions, and reactor parameters are set forth in Tables A, B and C, respectively.

TABLE A

PROCESS

| Parameter | Units | Preferred | More Preferred | Most Preferred |
|---|---|---|---|---|
| Molten Metal Temp | °C. | 1150–1600 | 1250–1550 | (50–150° C. above melting pt. during oxidizing cycle) |
| No. of Reactors | — | 2 or more | 2–6 | 3 |
| H:C ratio | mol | 1 or more | 1.5 or more | 1–4 |
| Cycle Control Responsive to: | Wt. % C | 0.2–4.5% | 0.5–4 | 1–3 wt. % C |
| | Melt time | 2–30 min. | 5–25 | 10–15 |
| CO Product Output | 1000s Kg/hr | 5–50 | 10–30 | 12–25 |
| CO Product Pressure | atm | 2–60 | 6–50 | 10–40 |
| CO Product Temp. | °C. | 1150–1600 | 1250–1550 | 1350–1500 |
| CO Quenched Temp. @ Valve | °C. | 100–400 | 150–350 | 200–300 |
| $H_2$ Product Output | Kg/hr | 100–3000 | 200–2000 | 300–1000 |
| $H_2$ Product Pressure | atm | 2–60 | 6–50 | 10–40 |
| $H_2$ Product Temp. | °C. | 1150–1600 | 1250–1550 | 1350–1500 |
| $H_2$ Quenched Temp. @ Valves | °C. | 100–400 | 150–350 | 200–300 |
| $H_2$ Cycle Duration | min. | 1–30 | 1.5–15 | 2–6 |
| CO Cycle Duration | min | 1–30 | 1.5–15 | 2–6 |

TABLE B

COMPOSITIONS

| Parameter | Units | Preferred | More Preferred | Most Preferred |
|---|---|---|---|---|
| Feed | Wt. % C | 60–100 | 75–100 | 80–100 |
| Feed: H:C mol ratio | C:H | 0.1–4 | 0.5–3 | 0.75–2 |
| CO Product Purity | mol % CO | 90–100 | 97–100 | 99–100 |
| $H_2$ Product Purity | mol % $H_2$ | 85–100 | 90–100 | 95–100 |

TABLE C

APPARATUS

| Reactor Parameters | Units | Preferred | More Preferred | Most Preferred |
|---|---|---|---|---|
| Reactor Inside Diameter | cm | 60–420 | 90–360 | 120–240 |
| Molten Metal Depth | cm | 60–420 | 90–360 | 150–300 |
| Metal Volume | $M^3$ | 0.15–60 | 0.6–30 | 1.4–14 |
| Lance Entry | — | top, side, or bottom | top or side | — |
| Lance Submergence | cm | 0–400 | 60–300 | 100–250 |

TABLE D

| | SDA | | | Molten Metal | | | Feed | | Product | | | |
|---|---|---|---|---|---|---|---|---|---|---|---|---|
| SDA Feed Rat | 215.00 | | | | | | | | | | | |
| | 17916.67 | | | 7351.4 | | | | | | | | |
| Temp °F. | 95.00 | | | 95 | | | Total | | | | | |
| | wt. % | lb/hr | Mol/hr | wt. % | lb/hr | mol/hr | lb/hr | mol/hr | lb/hr | mol/hr | wt. % | mol % |
| C | 84.05 | 15058.96 | 1253.748 | 74.87 | 5503.87 | 458.23 | 20562.83 | 1711.98 | | | | |
| H | 8.74 | 1565.92 | 1553.535 | 25.13 | 1847.53 | 1832.92 | 3413.45 | 3386.46 | $H_2$ | 3216.11 | 1595.29 | 61.54 | 95.25 |
| Cl | 0.00 | 0.00 | 0.00 | | | | 0.00 | 0.00 | $CH_4$ | 540.79 | 33.72 | 10.35 | 2.01 |
| N | 0.86 | 154.08 | 11.00069 | | | | 154.08 | 11.00 | HCl | 0.00 | 0.00 | 0.00 | 0.00 |
| O | 0.86 | 154.08 | 9.630569 | | | | 154.08 | 9.63 | CO | 269.75 | 9.63 | 5.16 | 0.58 |
| P | 0.00 | 0.00 | 0.00 | | | | 0.00 | 0.00 | $N_2$ | 154.12 | 5.50 | 2.95 | 0.33 |
| S | 5.49 | 983.63 | 30.67693 | | | | 983.63 | 30.68 | $H_2S$ | 1045.47 | 30.68 | 20.00 | 1.83 |

TABLE D-continued

| SDA | | Molten Metal | | | Feed | | Product | | |
|---|---|---|---|---|---|---|---|---|---|
| 100.00 | 17916.67 | 100.00 | 7351.40 | 2291.15 | 25268.07 | 5149.74 | Total | 5226.25 | 1674.82 |

| in Vessel ID | Density of Liq. Fe in Liq Heig | 429 % Δ Carbon | ft/sec S. Vel | ft3 Liq. Vol. | lb Liq. Wt. | Carbon u | Cycle time |
|---|---|---|---|---|---|---|---|
| 54 | 60 | 3.00 | 2.4 | 79.52 | 34114.75 | 1023.44 | 3.05 |

About 215 tons per day (17,916 pounds per hour) of this solvent deasphalted pitch 16 are fed first to reactor 10 through inlet valve 20 and down through a penetrating lance 30 into molten iron 40. Care is taken that the lance 30 is insulated and the flow rate is sufficient so that the pitch reaches its decomposition temperature only when it is in or very close to contact with the molten iron in the reactor. This provides instant dissolving of the carbon released from the pitch and avoids coke or carbon deposits or soot in the reactor gas phase. The pitch decomposes into products as shown in the last five columns of Table D, entitled "Product Gas". These products are released through outlet line 50, cooled in a high pressure boiling-water cooler 60 and thereafter further cooled in a low pressure boiling water cooler 70 so that their temperature is reduced to about 275° C. when they flow through swing valve 80 which is in the open position during this portion of the cycle. The product hydrogen is as shown in FIG. 7 and described in Table D and moves into hydrogen header 100 for export. Simultaneously, the second reactor 12 is fed substantially pure cryogenic air separation plant oxygen through oxygen inlet valve 112. The oxygen contacts the carbon dissolved in the molten iron in reactor 12, oxidizes it primarily to CO which is expelled through outlet line 52 and passes successively through heat exchangers 62 and 72, (corresponding to heat exchangers 60 and 70) and travels through CO valve 122 (hydrogen valve 82 remains closed) into the CO header 130 where it is exported for conversion to $CO_2$ or use in chemical synthesis. Again, all purities and flow rates of CO are shown in Table A, as are temperatures, pressures, etc.

After a preset time, about 3 minutes in this example, the valves are reversed with pitch inlet valve 20 closing on reactor 10 and oxygen inlet valve 110 opening substantially simultaneously with the closure of oxygen inlet valve 112 and the opening of the pitch inlet valve 22 on reactor 12. The exact sequencing and the pause between opening and closing, together with any optional purging may be varied as convenient for best production of highest quality gases.

During this entire sequence, reactor 14 remains in stand-by. During stand-by, reactor 14 could be rebuilt by replacing its refractories, lance, etc. The stand-by condition is rotated among reactors 10, 12 and 14 approximately daily or as needed. It should be apparent that various control systems may be employed for operation of the swing system including periodic opening and closing of swing valves 80, 82, 84 and 120, 122, 124 associated respectively with hydrogen header 106 common to all three reactors 10, 12 and 14 and carbon monoxide header 108 common to the same reactors. In the illustrated embodiment of FIG. 1, an electrical timer 160 connects to an electrical source via a pair of leads 162 and includes outlet control leads 164, 166, 168, 170, 172 and 174 which lead directly to electromagnetic swing valves 80, 120, 82, 122, 84 and 124, respectively. The timer 160 includes switching means for switching the valves from closed to open, and vice versa, in the manner described previously such that when the reactors 10, 12 and 14 are being supplied from hydrocarbon feed source 16 during an initial portion of the cycle and hydrogen gas is being produced, the swing system ensures connection between the hydrogen header 106 and such reactors. In a second portion of the cycle, the reactors are receiving an oxidant from a oxidant supply 18, the result of which is to create a carbon monoxide or carbon dioxide off-gas which escapes from the top of the reactor in the space above the molten iron bath 40 through the various gas product outlets 50, 52, 54 and being fed via now energized and open swing valves 120, 122 and 124, as the case may be, to the carbon monoxide header 108 for escape via line 130. By reference to FIG. 2, it is evident that for maximum purity of the hydrogen in the single cycle of operation for each of the reactors 10, 12, 14, the valves 80, 82, 84, 120, 122, and 124 are switched so that the flow of gas is diverted to the carbon monoxide manifold where the carbon monoxide level is 25% of its maximum equilibrium value and the gas diverted to the hydrogen manifold where its level is 75% of its maximum equilibrium value.

It is preferable to either shut off the hydrogen and carbon monoxide headers from the reactors during the major extent of operation of the reactors, or to vent the interior of those reactor chambers to the atmosphere. Referring back to FIG. 1, there is a dotted line showing of both the vent lines 140, 142, 144, the open/close valves 146, 148 and 150 for respective vent lines, with those vent lines being connected to respective product gas outlet lines 50, 52, 54 intermediate of the reactors 10, 12 and 14 and the swing valves for controlling system operation at 80, 82, 84, 120, 122 and 124. Further, in the illustrated embodiment as an alternative, timer energized lines 180, 190 and 192 connect the timer to the electromagnetically operated open/close valves 146, 148 and 150 respectively. Of course, this is only one illustrated embodiment of a control system for operating the swing valve of the plurality of molten metal reactors, normally two of which are operating in alternative modes under the preferred method of operation, while the third such as reactor 14 is shut down and subject to repair or reconstruction. A different control system may be employed using sensors for sensing the particular gas content within the reactor chambers above the level of the molten metal 40 or within the gas product discharge lines. Upon sensing a particular gas level of hydrogen or a carbon oxide, the swing valves are periodically switched from open to closed, or vice versa, corresponding to whether the cycle of operation for each reactor is in the hydrocarbon feed and thus the production of hydrogen part of the cycle or the feed of an oxidant and the production of carbon oxide off-gas. It is further evident that various other control schemes or combinations of the same may be employed to facilitate maximum recovery of high quality, high purity hydrogen and carbon oxide streams, while venting the interior of the chambers between such high purity production under the swing system of this invention. By using the vent lines 140, 142, 144, over a major time extent of the cycle of operations for the individual reactors, the quality of the hydrogen and carbon oxide streams is ensured. Alternatively, it may be desirable to simply purge the interior chambers of reactor vessels between the hydrogen production and carbon oxide portions of the reactor cycle. Similarly, the system may be operated at 400 psi as shown in FIG. 7, with high pressure pumps for feed, and optionally may have diluent in feed, consider as FIG. 5, the flow sheet.

EXAMPLE 2

(Purification of product streams)

Figure 5:
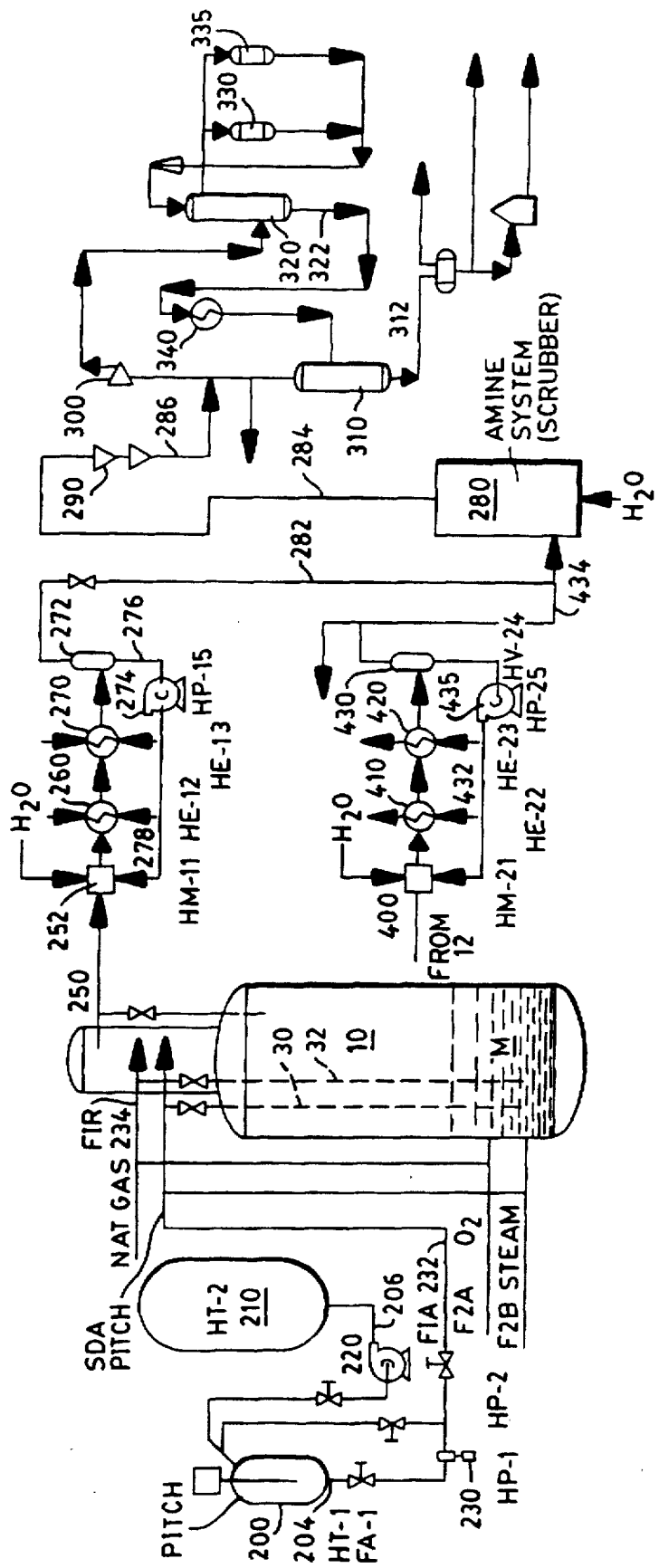
FIG. 5 is a schematic view of an apparatus forming another embodiment of the invention as described under Example 2 directed to purification systems for the respective product gases.

FIG. 5 shows mixing tank 200 for mixing diluent and pitch and equipped with stirrer 202 and bottom outlet 204 leading to high pressure pump 230, a vertical plunger pump manufactured by Ingersol Rand Company and diluent tank 210 feeding to mixing tank 200 via line 206 through pump 220 or varying the viscosity of the pitch fed through high pressure pump 230. Table E sets forth various operating parameters for the purification system of Example 2, FIG. 5.

TABLE E

HyMelt @ Section

| Component-MW Stream Number (flows in lb/hr) | HyMelt Vessesl 1 <113> | Quenched H₂ stream <115> | 1st Cool H₂ stream <131> | H₂O M/U H₂ stream <133> | 2nd Cool H₂ stream <135> | Product H₂ stream <136> | H₂O FILQ H₂ stream <137> | H₂O Quen H₂ stream <138> |
|---|---|---|---|---|---|---|---|---|
| Hydrogen-2 | 1431.66 | 1431.66 | 1431.66 | 0.00 | 1431.66 | 1431.66 | 0.00 | 0.00 |
| Methane-16 | 242.08 | 242.08 | 242.08 | 0.00 | 242.08 | 242.08 | 0.00 | 0.00 |
| CO-28 | 269.64 | 269.64 | 269.64 | 0.00 | 269.64 | 269.64 | 0.00 | 0.00 |
| CO₂-44 | 0.00 | 0.00 | 0.00 | 0.00 | 0.00 | 0.00 | 0.00 | 0.00 |
| MeOH-32 | 0.00 | 0.00 | 0.00 | 0.00 | 0.00 | 0.00 | 0.00 | 0.00 |
| H₂O-18 | 0.00 | 4636.08 | 4636.08 | 45.90 | 4636.08 | 35.82 | 4600.08 | 4600.08 |
| Nitrogen-28 | 154.00 | 154.00 | 154 | 0.00 | 154 | 154 | 0.00 | 0.00 |
| H₂S-34 | 1043.12 | 1043.12 | 1043.12 | 0.00 | 1043.12 | 1043.12 | 0.00 | 0.00 |
| TOTAL | 3140.50 | 7776.58 | 7776.58 | 45.90 | 7776.58 | 3176.32 | 4600.08 | 4600.08 |
| Mol Wt. | 4.0 | 7.5 | 7.5 | 18.0 | 7.5 | 4.1 | 18.0 | 18.0 |
| Temperature (°F.) | 2700 | 1496 | 450 | 100 | 100 | 100 | 100 | 100 |
| Pressure (psig) | 400 | 400 | 390 | 410 | 380 | 380 | 380 | 425 |

| Component-MW Stream Number (flows in lb/hr) | HyMelt Vessel 2 <213> | Quenched CO stream <215> | 1st Cool CO stream <231> | H₂O M/U CO stream <233> | 2nd Cool CO stream >235> | Product CO stream <236> | H₂O FILQ CO stream <237> | H₂O Quen CO stream <238> | CO to SynGas <240> | CO to Fuel <241> |
|---|---|---|---|---|---|---|---|---|---|---|
| Hydrogen-2 | 340.64 | 340.64 | 340.64 | 0.00 | 340.64 | 340.64 | 0.00 | 0.00 | 100.94 | 239.70 |
| Methane-16 | 0.00 | 0.00 | 0.00 | 0.00 | 0.00 | 0.00 | 0.00 | 0.00 | 0.00 | 0.00 |
| CO-28 | 34411.72 | 34411.72 | 34411.72 | 0.00 | 34411.72 | 34411.72 | 0.00 | 0.00 | 10196.76 | 24214.96 |
| CO₂-44 | 0.00 | 0.00 | 0.00 | 0.00 | 0.00 | 0.00 | 0.00 | 0.00 | 0.00 | 0.00 |
| MeOH-32 | 0.00 | 0.00 | 0.00 | 0.00 | 0.00 | 0.00 | 0.00 | 0.00 | 0.00 | 0.00 |
| H₂O-18 | 0.00 | 8263.80 | 8263.80 | 70.02 | 8263.80 | 69.48 | 8194.14 | 8194.14 | 19.80 | 0.00 |
| Nitrogen-28 | 0.00 | 0.00 | 0.00 | 0.00 | 0.00 | 0.00 | 0.00 | 0.00 | 0.00 | 0.00 |
| H₂S-34 | 0.00 | 0.00 | 0.00 | 0.00 | 0.00 | 0.00 | 0.00 | 0.00 | 0.00 | 0 |
| TOTAL | 34752.36 | 43016.16 | 43016.16 | 70.02 | 43016.16 | 34821.84 | 8194.14 | 8194.14 | 10317.50 | 24454.66 |
| Mol Wt. | 24.8 | 23.1 | 23.1 | 18.0 | 23.1 | 24.8 | 18.0 | 18.0 | 24.8 | 24.8 |
| Temperature (°F.) | 2700 | 1478 | 450 | 100 | 100 | 100 | 100 | 100 | | |
| Pressure (psig) | 400 | 400 | 390 | 410 | 380 | 380 | 380 | 425 | | |

MeOH Synthesis Loop

| Component-MW Stream Number (flows in lb/hr) | SynGas Feed <13> | Compress SynGas <23> | Recycle Gas <14> | Total MeOH Feed <15> | Pre-Heatec MeOH Feed <16> | Total MeOH Product <17> | 1st Cooled Product <18> | 2nd Cooled Product <19> | Total Flash Gas <20> | 1st Crude MeOH <21> | 2nd Flash <22> | Total MeOH Product <23> | Purge Gas <25> |
|---|---|---|---|---|---|---|---|---|---|---|---|---|---|
| Hydrogen-2 | 1532.60 | 1532.60 | 2399.60 | 3932.20 | 3932.20 | 2476.00 | 2476.00 | 2476.00 | 2454.36 | 2.06 | 1.92 | 0.16 | 54.76 |
| Methane-16 | 242.08 | 242.08 | 7587.20 | 7829.28 | 7829.28 | 7829.28 | 7829.28 | 7829.28 | 7755.20 | 52.48 | 30.72 | 21.60 | 168.00 |
| CO-28 | 10466.40 | 10466.40 | 8545.60 | 19012.00 | 19012.00 | 8817.20 | 8817.20 | 8817.20 | 8801.80 | 11.76 | 10.36 | 1.40 | 256.20 |
| CO₂-44 | 0.00 | 0.00 | 0.00 | 0.00 | 0.00 | 0.00 | 0.00 | 0.00 | 0.00 | 0.00 | 0.00 | 0.00 | 0.00 |
| MeOH-32 | 0.00 | 0.00 | 300.80 | 300.80 | 300.80 | 11952.00 | 11952.00 | 119052.00 | 473.28 | 11463.04 | 3.84 | 11459.20 | 172.48 |
| H₂O-18 | 0.00 | 0.00 | 37.80 | 93.42 | 93.42 | 93.42 | 93.42 | 93.42 | 55.98 | 38.88 | 0.54 | 38.34 | 18.18 |
| Nitrogen-28 | 55.62 | 55.62 | 4835.60 | 4989.60 | 4989.60 | 4989.60 | 4989.60 | 4989.60 | 4980.92 | 5.88 | 5.32 | 5.60 | 145.32 |

TABLE E-continued

| | | | | | | | | | | | | | |
|---|---|---|---|---|---|---|---|---|---|---|---|---|---|
| H$_2$S | 0.00 | 0.00 | 0.00 | 0.00 | 0.00 | 0.00 | 0.00 | 0.00 | 0.00 | 0.00 | 0.00 | 0.00 | 0.00 |
| TOTAL | 12450.70 | 12450.70 | 23706.60 | 36157.30 | 36157.30 | 36157.50 | 36157.50 | 36157.50 | 24521.54 | 11574.10 | 52.70 | 11526.30 | 814.94 |
| Mol Wt. | 10.7 | 10.7 | 11.0 | 10.9 | 10.9 | 13.9 | 13.9 | 13.9 | 11.0 | 31.7 | 14.7 | 31.8 | 13.9 |
| Temperature (°F.) | 99.3 | 245.1 | 100 | 191.4 | 450 | 500 | 249 | 100 | 100 | 100 | 104 | 104 | 100 |
| Pressure (psig) | 360 | 985 | 985 | 1185 | 1125 | 1085 | 1035 | 985 | 985 | 985 | 135 | 135 | 985 |
| H$_2$/CO T = 2 | 2.05 | 2.05 | 3.93 | 2.90 | 2.90 | 3.93 | 3.93 | 3.93 | 3.90 | | 2.59 | 1.60 | 2.99 |
| (H$_2$—CO$_2$)/CO + CO$_2$) | 2.05 | 2.05 | 3.93 | 2.90 | 2.90 | 3.93 | 3.93 | 3.93 | 3.90 | | 2.59 | 1.60 | 2.99 |
| H$_2$/(2CO + 3CO$_2$) | 1.03 | 1.03 | 1.97 | 1.45 | 1.45 | 1.97 | 1.97 | 1.97 | 1.95 | | 1.30 | 0.80 | 1.50 |

The pump communicates through a line 232 to molten metal lance 30 as, for instance in molten metal reactor 10, FIG. 1. A source of natural gas 234 connects with a second lance 32 (the same lance as used for the pitch may alternately be used) and enters into the molten metal bath M in reactor 10. This natural gas is used for temperature control and heat balance and can compensate for fluctuations in carbon: hydrogen ratio in the pitch feed. Product gases (hydrogen $H_2$ at this point in the cycle) flow outward through product gas outlet line 250 through quench 252 and successively through coolers 260 and 270 (approximately the same as coolers 60 and 70 in FIG. 1, Example 1) into a knockout drum 272 which has a bottom outlet and recycle system 276 including a recycle line 278 and a pump 274 for return of condensed water back to quench 252. Hydrogen from knockout drum 272 is fed via line 282 to a scrubber means 280 which removes hydrogen sulfide ($H_2S$) and emits a substantially sulfur-free hydrogen stream through line 284 to compressor 290 which has an outlet pressure of approximately 8.3 million pascals (1200 psig). The sulfur-free hydrogen stream then flows via line 286 into recycle compressor 300 which increases the pressure approximately one atmosphere and combines the new hydrogen with recycle hydrogen and CO coming from methanol knockout drum 310 via line 292. The combined $H_2/CO$ stream flows into heat exchanger 320, then simultaneously through methanol conversion reactors 330 and 335 which are in parallel. The outlet stream from heat exchanger 320 is sent through cooler 340 via line 322 and back to knockout drum 310 from the bottom of which condensed methanol and water are removed by line 312 as a crude methanol stream for drying and further purification if necessary.

Simultaneously, reactor 12 (shown in FIG. 1, but not shown in FIG. 5) provides CO from crucible 12 to water quench 400, FIG. 5, which leads into steam cooler 410 and onto water cooler 420, then into a water removing drum 430, from which water is recycled by line 432 through pump 435 back to water quench 400. The resulting CO stream moves from water removal drum 430 to a scrubber means 280 (described previously) via line 434 where it mixes with the hydrogen. The hydrogen: CO ratio is approximately 2.01:1, that is, approximately stoichiometric.

MODIFICATIONS

Specific compositions, methods, or embodiments discussed are intended to be only illustrative of the invention disclosed by this specification. Variations in these compositions, methods, or embodiments are readily apparent to a person of skill in the art based upon the teachings of this specification and are therefore intended to be included as part of the invention disclosed herein.

Reference to documents made in the specification is intended to result in such patents or literature being expressly incorporated herein by reference.

What is claimed is:

1. Apparatus for direct conversion of a hydrocarbon feed to a gas comprising substantially pure hydrogen and carbon monoxide at a pressure in the range of 25 psia to 3,000 psia, said apparatus comprising:

a) a plurality of single chamber reactors in the form of closed pressure vessels containing molten metal, b) each reactor including at least one hydrocarbon feed and oxygen feed inlet for feeding a hydrocarbon material and an oxidant to said molten metal, and a product gas outlet for removing hydrogen and carbon oxide from said reactors, c) a hydrogen header commonly connected to said product gas outlets of said reactors, d) a carbon monoxide header commonly connected to said product gas outlets of said reactors, e) a source of hydrocarbon feed connected to said at least one inlet of each reactor, f) an oxidant source connected to said at least one inlet of each reactor, g) means for sequentially connecting said source of hydrocarbon feed and said oxidant feed source to said at least one inlet of each reactor, and h) means for selectively connecting each reactor alternately to said hydrogen header when said reactor is being fed from said hydrocarbon source and to said CO header when said reactor is being fed from said oxidant source such that essentially pure hydrogen and carbon oxide product gases are selectively recovered respectively by said hydrogen header and said carbon monoxide header.

2. The apparatus as claimed in claim 1, wherein said means for selectively connecting each reactor alternately to said hydrogen header and said carbon monoxide header comprises at least one swing valve within each gas outlet of said reactors and control means for controlling said swing valves for periodically connecting each of said reactor outlets to a selected one of said hydrogen header and said carbon monoxide header.

3. The apparatus as claimed in claim 2, wherein said swing valves comprise electrically operated open/close valves, and said control means comprises a source of electrical energy, and means for periodically, selectively connecting said open/close valves to said source of electrical energy for changing the state of said swing valves.

4. The apparatus as claimed in claim 2, wherein said swing valves comprise electrically operated open/close valves, a source of electrical energy, and a timer connecting said source of electrical energy to said swing valves for periodically, sequentially energizing said swing valves to initially connect said reactors via said product gas outlets to said hydrogen header during feeding of said hydrocarbon feed to said molten metal within said reactors, and subsequently to connect said product gas outlets of said reactors to said carbon monoxide header during cyclic operation of said apparatus.

5. The apparatus as claimed in claim 1, further comprising means for sensing predetermined levels of hydrogen and a carbon oxide within said gas product outlet of said reactors, and means connected to said sensing means and responsive to sensing a predetermined level of hydrogen within a given outlet for connecting said given outlet to said hydrogen header, and means connected to said sensing means and responsive to sensing a carbon oxide at said predetermined level within a given gas product outlet for connecting said given gas product outlet to said carbon monoxide header and for terminating the connection of said given gas product outlet to said hydrogen header.

6. The apparatus as claimed in claim 5, wherein said swing valves comprise a pair of swing valves connected in parallel with each other and commonly to said product gas outlet of each reactor and respectively to said hydrogen header and said carbon monoxide header.

7. The apparatus as claimed in claim 1, further comprising vent means operatively coupled to said plurality of reactors for venting the interior of the reactor during a transition between the hydrocarbon feeding of each reactor and oxidant feeding of each reactor.

8. The apparatus as claimed in claim 2, wherein said means for venting said single chamber reactors comprises a vent line coupled to each said product gas outlet intermediate of each of said reactors and said swing valves.

9. The apparatus as claimed in claim 8, wherein each vent line includes an electrically operated open/close valve, and a timer for connecting said open/close valves of said vent lines to said source of electrical energy, whereby said timer controls the extent of venting of said single chamber reactors during operation of said apparatus after initial feeding of the hydrocarbon feed to each of said reactors and prior to initiation of the feed of said oxidant to each of said reactors.

10. The apparatus as claimed in claim 1, further comprising a mixing tank upstream of said at least one hydrocarbon feed and oxidant feed inlet and connected thereto for mixing a diluent and pitch, said mixing tank being equipped with a stirrer and a bottom outlet leading to high pressure pump in a line connecting said mixing tank to said at least one hydrocarbon feed and oxidant feed inlet to each reactor, and a diluent tank connected to said mixing tank for feeding a diluent to said mixing tank, and for varying the viscosity of a pitch fed through said high pressure pump.

11. The apparatus as claimed in claim 1, further comprising a source of natural gas connected to said at least one hydrocarbon feed and oxidant inlet, and wherein said at least one inlet terminates in a distal end penetrating the surface of said molten metal within each of said reactors, whereby said natural gas functions to control the temperature and heat balance to compensate for fluctuations in a carbon:hydrogen ratio of the pitch feed.

12. The apparatus as claimed in claim 1, further comprising a quench and at least one cooler within said product gas outlet, upstream of a knockout drum having a bottom outlet and a recycle system for recycling condensate in the knockout drum back to said quench upstream of said at least one cooler such that said knockout drum removes any hydrogen sulfide content of the product gas and emits a substantially sulfur-free hydrogen stream.

13. The apparatus as claimed in claim 12, further comprising means for flowing said sulfur-free hydrogen stream through at least one compressor for increasing the pressure approximately one atmosphere and means for combining said sulfur-free hydrogen stream with recycle hydrogen and carbon monoxide emanating from a downstream methanol knockout drum.

14. The apparatus as claimed in claim 13, further comprising means for flowing a combined hydrogen carbon monoxide stream through at least one methanol conversion reactor downstream of said methanol knockout drum after passage through a downstream heat exchanger, and means for recirculating a condensate outlet stream from said downstream heat exchanger back to said methanol knockout drum.

15. The apparatus as claimed in claim 14, further comprising means for removing condensed methanol and water from the bottom of said knockout drum as a crude methanol stream for subsequent drying and further purification.

16. The apparatus as claimed in claim 15, further comprising means for removing from each of said reactors periodically carbon monoxide and subjecting said carbon monoxide to a water quench and subsequently to at least one of a steam cooler and a water cooler and thence to a water removing drum, and said apparatus further comprises means for recycling water from said water removing drum back to said water quench means.

17. The apparatus as claimed in claim 16, further comprising means for supplying the resulting carbon monoxide stream from said water removing drum to said scrubber, wherein said CO stream mixes with hydrogen within said scrubber, with the hydrogen carbon monoxide ratio being approximately stoichiometric.

* * * * *